Sept. 23, 1930.  D. BUCCICONE  1,776,616
PACK HANDLING APPARATUS
Filed March 1, 1929  2 Sheets-Sheet 1
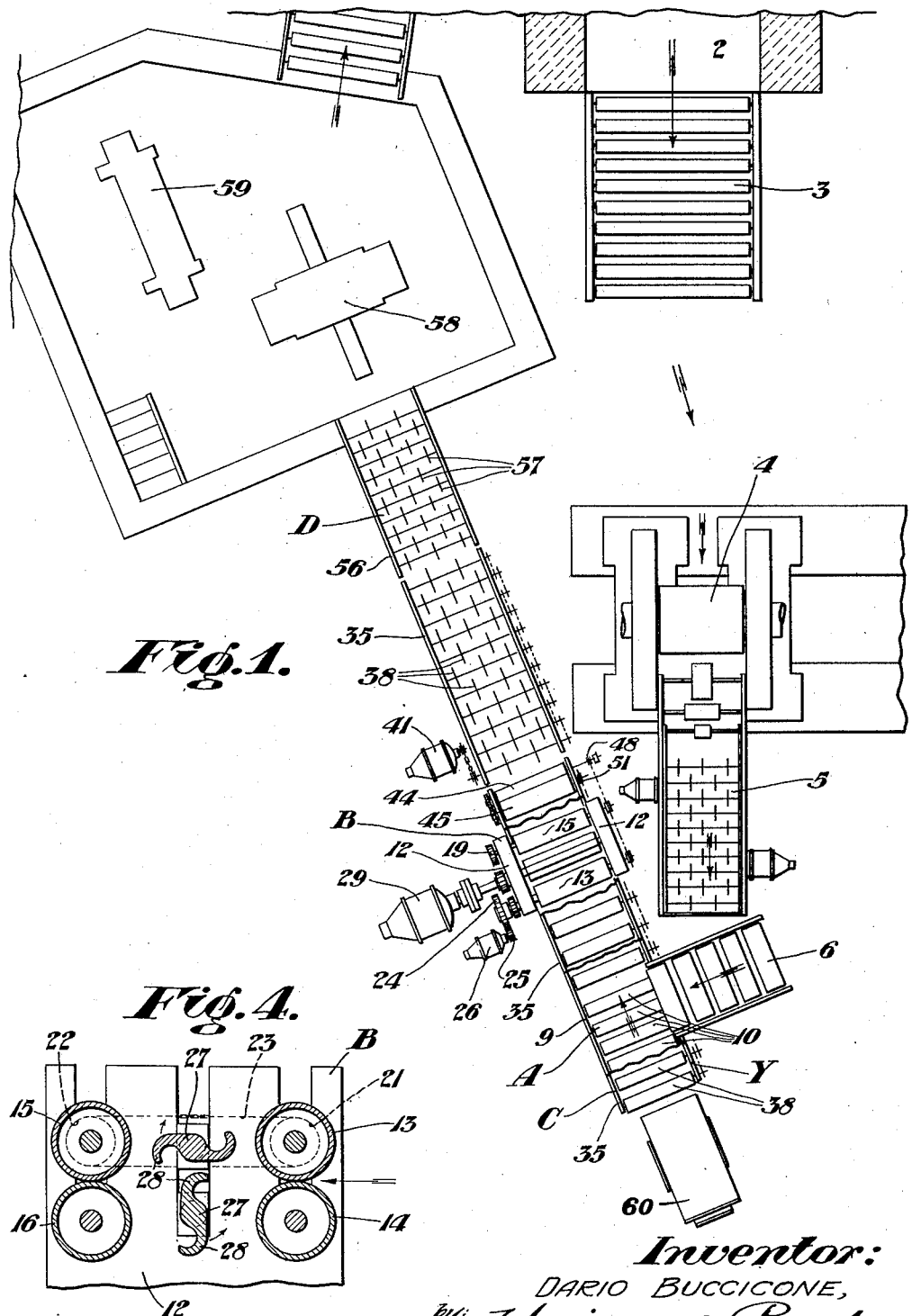

Sept. 23, 1930.    D. BUCCICONE    1,776,616
PACK HANDLING APPARATUS
Filed March 1, 1929    2 Sheets-Sheet 2
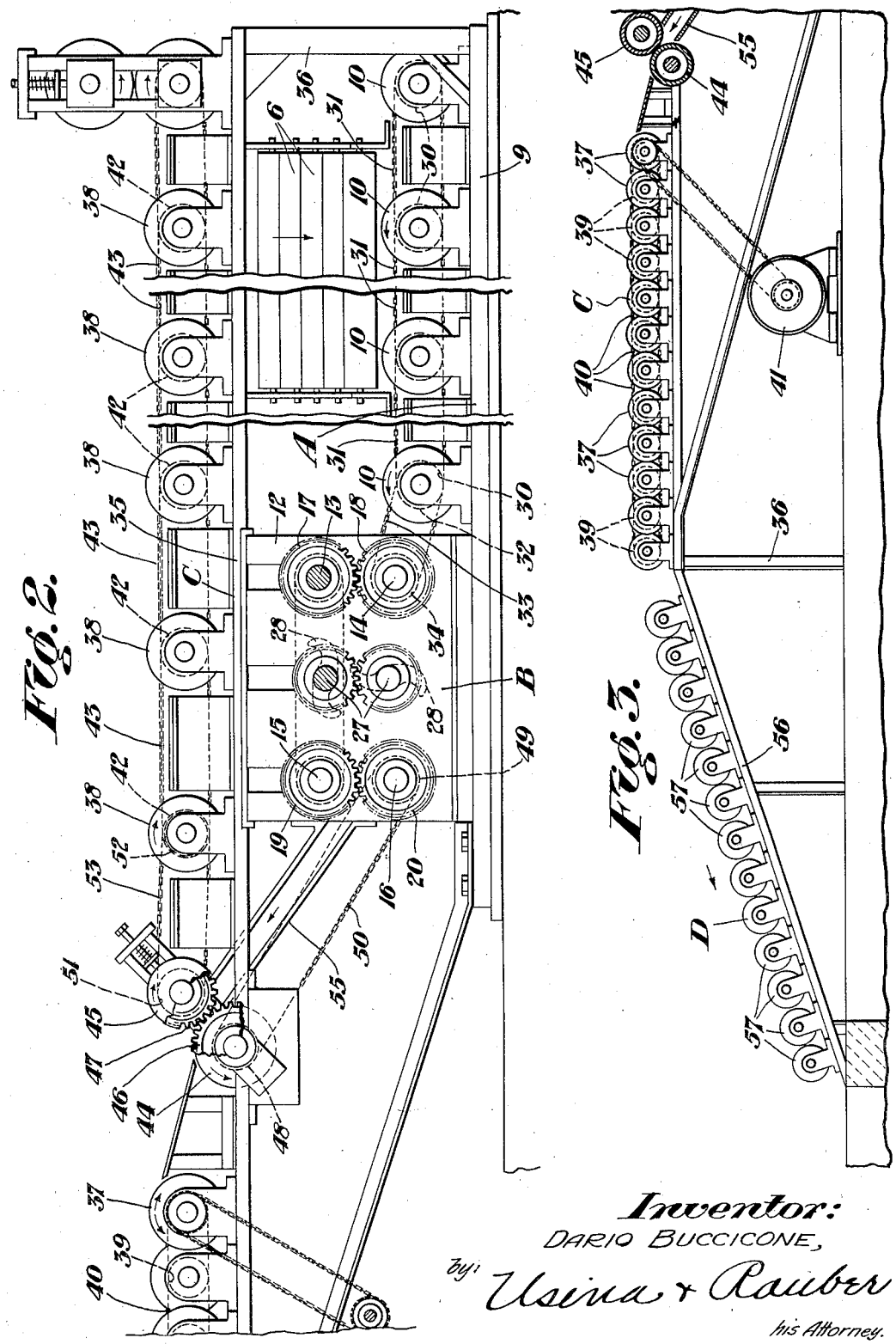

Patented Sept. 23, 1930

1,776,616

UNITED STATES PATENT OFFICE

DARIO BUCCICONE, OF GARY, INDIANA, ASSIGNOR TO AMERICAN SHEET AND TIN PLATE COMPANY, A CORPORATION OF NEW JERSEY

PACK-HANDLING APPARATUS

Application filed March 1, 1929. Serial No. 343,826.

This invention relates to pack handling and working apparatus for hot mills and more particularly to a system of conveyers in combination with a mechanical catcher and pack opening machine so designed that the packs will be mechanically handled and opened on the catcher's side of the mill and either delivered to the doubler or to a pile, as desired.

Heretofore, catchers like that forming a part of this invention have been used to handle the packs of sheets on the catcher's side of the mill. However, no mechanical means were provided for handling the packs after the rolling operation was complete and such packs were manually opened, doubled and sheared.

The present novel combination of apparatus provides for mechanically handling and opening the packs so that the manual labor is lessened by half on each hot mill.

In the drawings:

Figure 1 is a plan view, partly in section, of a hot mill equipped with the apparatus of this invention.

Figure 2 is a side elevation of part of the pack handling and working apparatus.

Figure 3 is a side elevation of the remainder of the pack handling apparatus.

Figure 4 is a fragmentary sectional elevation through the pack opening apparatus.

Referring more particularly to the drawings, the numeral 2 designates a continuous pack heating furnace of any well known design which is adapted to deliver the heated packs onto a gravity conveyer 3 which terminates at a point adjacent the hot mill 4 so that the roller may readily grasp the heated packs and feed them into the mill. The heated packs are given several passes through the mill and are handled on the catcher's side of the mill by a mechanical catcher 5 which, when the packs are rolled to the desired gage and thickness, is adapted to deliver the packs rearwardly onto a gravity conveyer 6 of any well known construction.

The gravity conveyer 6 is arranged to deliver the packs sidewise at an angle to their path of travel through the mill 4 and over the catcher 5.

A pack handling and working unit Y is mounted at the rear and to one side of the mill 4 and consists of a power conveyer A adapted to receive the packs from the gravity conveyer 6, a pack opening machine B, an upper power conveyer C arranged above and extending forwardly and rearwardly of the pack opening machine B, and an inclined gravity delivery conveyer D.

The lower power conveyer A is mounted on the mill floor and comprises a frame 9 on which are journaled a plurality of conveyer rollers 10 which are arranged at a proper elevation to receive the packs from the gravity conveyer 6.

The pack opening machine B is mounted immediately forward of and adjoining the conveyer A, and comprises a pair of side housings 12 in which are journaled two pairs of pinch-rollers 13 and 14, and 15 and 16, respectively.

The feed-in pinch-rollers 13 and 14 are geared together by gears 17 and 18 and the feed-out pinch-rollers 15 and 16 are geared together by gears 19 and 20.

The upper rollers 13 and 15 of the respective pairs of pinch-rollers are provided with sprockets 21 and 22 connected by a chain 23, and the upper roll 13 of the feed-in pinch-rollers is provided with a gear 24 which is meshed with a pinion gear 25 on the armature shaft of a motor 26.

A pair of beaters comprising shafts 27 and integral beater arms 28 are journaled in the housings 12 intermediate the pinch-rollers and are adapted to alternately engage the packs so as to alternately bend said packs up and down, thus opening the pack. The shafts 27 are geared together and the upper shaft 27 is connected directly to the armature shaft of a motor 29.

The conveyer rollers 10 of the conveyer A are all connected together by sprockets 30 and chains 31, and the foremost roller is provided with a sprocket 32 which is connected by a chain 33 with a sprocket 34 on the lower roller 14 of the feed-in pinch-rollers.

The upper power conveyer C comprises a frame 35 supported above the lower conveyer A and pack opening machine B by uprights 36. The conveyer C has two sets of conveying rollers 37 and 38, the forward set 37 being interconnected by sprockets 39 and chains 40 and being operated by a reversible motor 41 coupled to the shaft of the rearmost roller of the front set.

The rearmost set of rollers 38 are interconnected by sprockets 42 and chains 43, and are separated from the forward set of rollers 37 by a pair of pinch-rollers 44 and 45 which are geared together by gears 46 and 47. The lower pinch-roller 44 is provided with a sprocket 48 which is connected with a sprocket 49 on the lower pinch-roller 16 of the pack opener feed-out pinch rollers by a chain 50, so that the pinch-rollers 44 and 45 will be operated in unison and by the same motor as the pinch-rollers of the pack opening machine.

The upper pinch-roller 45 is provided with a sprocket 51 which is connected with a sprocket 52 on the foremost roller of the rear set of conveyer rollers 38 of the conveyer C by a chain 53, so as to drive said rear set of rollers rearwardly or in a clockwise direction simultaneously with the operation of the pack opening machine and the pinch-rollers 44—45.

A suitable upwardly and forwardly inclined guide-plate 55 is arranged between the feed-out pinch-rollers 15 and 16 of the pack opening machine and the pinch-rollers 44 and 45, so as to guide the packs upwardly from the feed-out pinch-rollers into the bite of the pinch-rollers 44—45.

The gravity conveyer D is mounted forwardly of the conveyer C and comprises an inclined frame 56 and conveying rollers 57. The conveyer D receives the packs of fours which are to be doubled and sheared prior to reheating and rerolling, and delivers them adjacent the doubling apparatus 58 and shear 59 in readiness for the operator to grasp them and pass them through the doubling apparatus and shear.

In operation, the packs, after they are rolled to proper gage, are delivered rearwardly by the catcher 5 onto the gravity conveyer 6 which delivers them onto the lower power conveyer A of the pack handling and working unit Y. The conveyer A will move the packs forwardly into the bite of the pinch-rollers 13 and 14 of the pack opening machine B, which rollers will feed the pack through the machine and into the bite of the feed-out rollers 15—16.

As the packs pass through the machine B, the beater arms 28 will engage and work the packs so as to open or separate the several sheets.

As the packs are fed through the feed-out rollers 15—16, they will engage the guide-plate 55 and be deflected upwardly into the bite of the pinch-rollers 44—45 on the upper conveyer C, which pinch-rollers will feed the opened packs forwardly onto the forward set of conveyer rollers 37.

When the mill is operating on or rolling packs of fours, the rollers 37 will be operated in a forward or counterclockwise direction, and when the mill is rolling packs of eights, the rollers 37 will be operated in a rearward or clockwise direction. The change in direction of rotation of the rollers 37 is accomplished by simply reversing the motor 41.

When operating on packs of fours, the rollers 37 will deliver the packs forwardly onto the gravity conveyer D which will deliver the packs to a point adjacent the doubler 58 and shear 59. When operating on packs of eights, which are finished packs, the rollers 37 will deliver the opened packs rearwardly over the pinch-rollers 44—45 and onto the conveying rollers 38 which will convey the packs rearwardly and deliver them into the standard piling rack 60.

While I have shown and described certain specific embodiments of my invention, it will be understood that I do not wish to be limited thereto, since various modifications may be made without departing from the scope thereof, as defined in the appended claims.

I claim:

1. The combination with a hot mill of a mechanical catcher for receiving the packs of sheets or plates being rolled in said mill, said catcher being adapted to convey said packs away from said mill after they have been rolled to a predetermined length, a conveyer adapted to receive said finished packs from said catcher and to deliver said packs sidewise at an angle to their path of travel through said mill and along said catcher, a second conveyer adapted to receive said packs from said first named conveyer and extending forwardly toward said mill, a pack opening machine at the forward end of said second conveyer and adapted to receive the packs from said second conveyer, a third conveyer arranged above said second conveyer and said pack opening machine and extending forwardly and rearwardly of said pack opening machine, said pack opening machine including means for propelling said packs therethrough, and a guide for directing the opened packs upwardly from said pack opening machine onto said last named conveyer.

2. The combination with a hot mill of a mechanical catcher for receiving the packs of sheets or plates being rolled in said mill, said catcher being adapted to convey said packs away from said mill after they have been rolled to a predetermined length, a gravity conveyer adapted to receive said finished packs from said catcher and to deliver said packs sidewise at an angle to their path of travel through said mill and along said catcher, a second conveyer adapted to receive said packs from said first named conveyer and extending forwardly toward said mill, a pack opening machine at the forward end of said second conveyer and adapted to receive the packs from said second conveyer, a third conveyer arranged above said second conveyer and said pack opening machine and extending forwardly and rearwardly of said pack opening machine, the portion of said conveyer forward of said pack opening machine being operable in reverse directions and independent of the rear portion of said conveyer, said pack opening machine including means for propelling said packs therethrough, and a guide for directing the opened packs upwardly from said pack opening machine onto said last named conveyer.

3. The combination with a hot mill of a mechanical catcher for receiving the packs of sheets or plates being rolled in said mill, said catcher being adapted to convey said packs away from said mill after they have been rolled to a predetermined length, a gravity conveyer adapted to receive said finished packs from said catcher and to deliver said packs sidewise at an angle to their path of travel through said mill and along said catcher, a second conveyer adapted to receive said packs from said first named conveyer and extending forwardly toward said mill, a pack opening machine at the forward end of said second conveyer and adapted to receive the packs from said second conveyer, a third conveyer arranged above said second conveyer and said pack opening machine and extending forwardly and rearwardly of said pack opening machine, the portion of said conveyer forward of said pack opening machine being operable in reverse directions and independent of the rear portion of said conveyer, said pack opening machine including means for propelling said packs therethrough, a guide for directing the opened packs upwardly from said pack opening machine onto said last named conveyer, and a pair of pinch-rollers for pulling said packs up over said guide.

4. In a pack handling and working apparatus, a conveyer, a pack opening machine adapted to work the packs so as to break the bond between the sheets of said pack, said pack opening machine including means for feeding the packs therethrough, a second conveyer arranged above said first named conveyer and said pack opening machine and in line with said machine, said last named conveyer extending forwardly and rearwardly of said pack opening machine, the portion of said conveyer forward of said pack opening machine being operable in reverse directions and independent of the rear portion thereof, and a guide for directing the opened packs upwardly from said pack opening machine onto said last named conveyer.

In testimony whereof, I have hereunto set my hand.

DARIO BUCCICONE.